(12) United States Patent
Yao

(10) Patent No.: US 9,154,573 B2
(45) Date of Patent: Oct. 6, 2015

(54) INFORMATION EXCHANGE APPARATUS, METHOD AND MANAGING SYSTEM APPLIED THERETO

(75) Inventor: Li-Ho Yao, Taipei (TW)

(73) Assignee: Chih-Ang Yao, Taipei (TW)

( * ) Notice: Subject to any disclaimer, the term of this patent is extended or adjusted under 35 U.S.C. 154(b) by 736 days.

(21) Appl. No.: 12/694,469

(22) Filed: Jan. 27, 2010

(65) Prior Publication Data

US 2010/0199358 A1 Aug. 5, 2010

(30) Foreign Application Priority Data

Feb. 3, 2009 (TW) .............................. 98103357 A

(51) Int. Cl.
*G06F 15/16* (2006.01)
*H04L 29/08* (2006.01)
*H04W 12/06* (2009.01)
*H04W 88/02* (2009.01)

(52) U.S. Cl.
CPC ............. *H04L 67/306* (2013.01); *H04W 12/06* (2013.01); *H04W 88/02* (2013.01)

(58) Field of Classification Search
USPC .......................................... 709/201, 218, 227
See application file for complete search history.

(56) References Cited

U.S. PATENT DOCUMENTS

| 7,184,755 | B2 | 2/2007 | Fukushima |
| 7,377,441 | B2 | 5/2008 | Wiklof et al. |
| 7,392,288 | B2 * | 6/2008 | Ooi et al. ...................... 709/205 |
| 7,509,372 | B2 * | 3/2009 | Dutta et al. .................... 709/203 |
| 7,753,788 | B2 | 7/2010 | Lum et al. |
| 7,792,702 | B1 * | 9/2010 | Katz et al. ..................... 705/26.1 |
| 7,814,208 | B2 * | 10/2010 | Stephenson et al. .......... 709/227 |
| 2002/0099796 | A1 * | 7/2002 | Chou ............................. 709/219 |
| 2004/0046656 | A1 | 3/2004 | Schaefer et al. |
| 2004/0128198 | A1 * | 7/2004 | Register et al. ................. 705/14 |
| 2004/0203671 | A1 * | 10/2004 | Fukushima ................ 455/414.3 |
| 2006/0142034 | A1 | 6/2006 | Wentink et al. |
| 2006/0149632 | A1 * | 7/2006 | Register et al. ................. 705/14 |
| 2007/0071209 | A1 * | 3/2007 | Horvitz et al. ........... 379/201.06 |
| 2007/0158403 | A1 * | 7/2007 | Ertas ............................. 235/375 |

(Continued)

FOREIGN PATENT DOCUMENTS

| CN | 1466062 A | 1/2004 |
| DE | 19929188 A1 | 1/2001 |

(Continued)

*Primary Examiner* — Minh-Chau Nguyen
(74) *Attorney, Agent, or Firm* — Alan D. Kamrath; Kamrath IP Lawfirm, P.A.

(57) ABSTRACT

An information exchange apparatus has a processing unit, a wireless communication unit, a storage unit, a mainframe connection port and an identification module. The wireless communication unit has a transmitter and a receiver connected to the processing unit. The storage unit is connected to the processing unit and stores a device identification (ID) code, user information and data exchange records. The mainframe connection port is connected to the processing unit for connecting to an electronic device. The identification module is connected to the processing unit, has a secure memory and stores an identification procedure. The secure memory stores the device ID code and an identification key. The identification module allows the processing unit to access data in the storage unit and exchange data in the storage unit with other information exchange apparatus when the processing unit passes the identification procedure.

58 Claims, 5 Drawing Sheets

(56) References Cited

U.S. PATENT DOCUMENTS

| | | |
|---|---|---|
| 2007/0282621 A1 | 12/2007 | Altman et al. |
| 2008/0026742 A1 | 1/2008 | Thomas et al. |
| 2008/0056269 A1 | 3/2008 | Madhani et al. |
| 2008/0091761 A1* | 4/2008 | Tsao .......................... 709/201 |
| 2008/0100466 A1 | 5/2008 | Lopreiato |
| 2008/0301214 A1* | 12/2008 | Li et al. ......................... 709/201 |
| 2009/0043868 A1* | 2/2009 | Hathaway ..................... 709/218 |

FOREIGN PATENT DOCUMENTS

| | | |
|---|---|---|
| TW | I260899 B | 8/2006 |
| WO | WO2007119088 A1 | 10/2007 |

* cited by examiner

INFORMATION EXCHANGE APPARATUS, METHOD AND MANAGING SYSTEM APPLIED THERETO

BACKGROUND OF THE INVENTION

1. Field of the Invention

The present invention relates to an apparatus, a method and a system and, more particularly, to an information exchange apparatus that allows a user to share and exchange information with other users, an information exchange method applied to the information exchange apparatus and a managing system applied to the information exchange apparatus.

2. Description of Related Art

Today, people are living in a world that is full of new knowledge and information. People also spread new knowledge and information instead of retrieving it because of the popularity of the Internet. For example, online dating, e-commerce, web logs (blogs) or the like are popular information exchange services via the Internet. The information exchange services create virtual environments for people to exchange information or communicate with each other. However, people cannot really know each other in the virtual environments, because the virtual environments are not the real world. Shortcomings of information exchange services via the Internet such as online dating and e-commerce are described as follows.

Online dating is implemented on a website that has members and allows the members to contact and share personal information with each other over the Internet for developing friendships or romantic relationships by using computers or cell phones. However, because members do not meet each other face to face during online dating, some members may misrepresent themselves or provide fake information. This is why Internet fraud happens frequently. There is an inherent lack of trust between members.

E-commerce is also implemented on a website that provides products or services and allows users to buy or sell over the Internet. However, because the consumers cannot check interested products before purchase, it is not easy for consumers to pick out what they want. The consumers are also at a high risk of fraud, because E-commerce often requires the consumers to pay first. On the other hand, because E-commerce is a one-way service, the proprietor who provides products to consumers does not understand what the consumers are interested in. The proprietor of E-commerce cannot provide new products according to what the consumers are interested in.

To overcome the shortcomings, the present invention provides an information exchange apparatus, method and managing system applied thereto to mitigate or obviate the aforementioned problems.

SUMMARY OF THE INVENTION

The main objective of the invention is to provide an information exchange apparatus, method and managing system applied thereto.

The information exchange apparatus in accordance with the present invention comprises a processing unit, a wireless communication unit, a storage unit, a mainframe connection port and an identification module. The processing unit has a clock that counts time and provides local time. The wireless communication unit has a transmitter and a receiver, and the transmitter and the receiver are connected to the processing unit. The storage unit is connected to the processing unit and stores a device identification (ID) code, user information and data exchange records, and each data exchange record has exchanged content, exchange time and device ID code of a peering information exchange apparatus. The mainframe connection port is connected to the processing unit for connecting to an electronic device such as a computer so the electronic device is capable to set and exchange data with the information exchange apparatus. The identification module is connected to the processing unit, has a secure memory and stores an identification procedure. The secure memory stores the device ID code and an identification key. The identification module allows the processing unit to access data in the storage unit and exchange data in the storage unit with other information exchange apparatus when the processing unit executes and passes the identification procedure.

The managing system in accordance with the present invention allows the above mentioned information exchange apparatus to connect thereto to upload or download data. The managing system comprises a database, a website and a data analysis module. The database stores basic information of the information exchange apparatus, the data exchange records in the information exchange apparatus, owner information and the information of the relationship between the owners and the information exchange apparatuses. The website is connected to the database and allows receiving uploaded basic information of the information exchange apparatus and the data exchange records in the information exchange apparatus. The website also allows the information exchange apparatus to upload and download data to and from the information exchange apparatus. The data analysis module is connected to the database and the website to analyze the information in the database and the data exchange records from the information exchange apparatus.

The information exchange apparatus intermittently broadcasts wireless signals to notify nearby information exchange apparatuses. When one user with the information exchange apparatus is close to other users (may be people or shops) with the information exchange apparatuses, the information exchange apparatuses exchange the user information with each other.

When the user with the information exchange apparatus meets strangers with the information exchange apparatuses by chance, the user can know the strangers from the exchanged user information. Because the users also meet the strangers face to face, the user can actually know the correctness of the user information. The information exchange can reduce Internet fraud frequently happening to online dating.

On the other hand, if the information exchange apparatus is set in a shop, the information exchange apparatus intermittently broadcasts wireless signals including user information, that is the product information, to notify nearby information exchange apparatuses. When the users with the information exchange apparatuses are close to the shop, the users can read the product information in the shop from the exchanged user information. Further, the shop owner can also post new product information on the website in the managing system to allow the user's information exchange apparatus to download the new product information so the new products can be promoted through the information exchange apparatus and the managing system.

Other objectives, advantages and novel features of the invention will become more apparent from the following detailed description when taken in conjunction with the accompanying drawings.

DETAILED DESCRIPTION OF PREFERRED EMBODIMENTS

Figure 1:
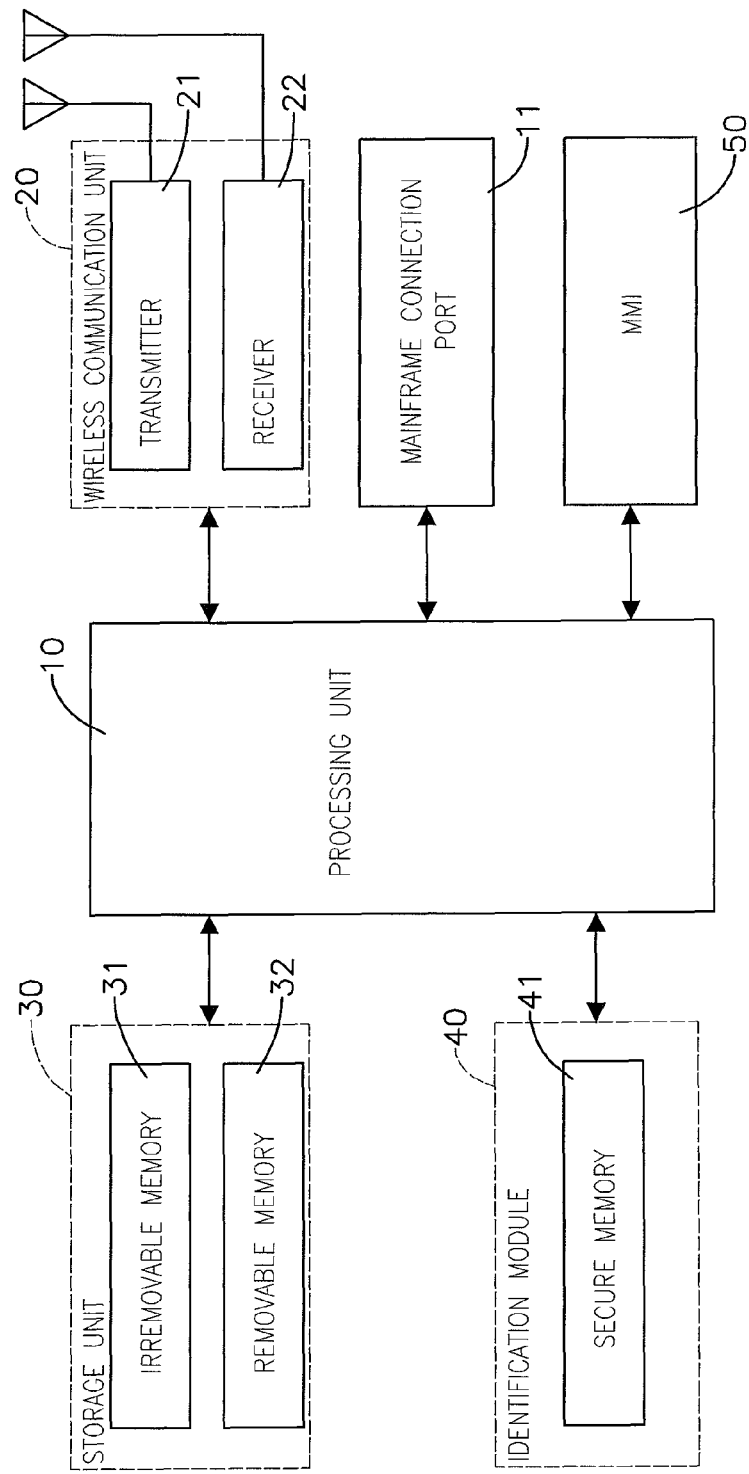
FIG. 1 is a functional block diagram of a first embodiment of an information exchange apparatus in accordance with the present invention.

With reference to FIG. 1, a first embodiment of an information exchange apparatus in accordance with the present invention may be implemented to have a card appearance and comprises a processing unit (10), a wireless communication unit (20), a storage unit (30), a mainframe connection port (11), an identification module (40) and a man-machine interface (MMI) (50).

The processing unit (10) has a clock. The clock counts time and provides local time.

The wireless communication unit (20) has a transmitter (21) and a receiver (22). The transmitter (21) and the receiver (22) are connected to the processing unit (10) to transmit and receive data. The wireless communication unit (20) may be implemented with a protocol such as Institute of Electrical and Electronic Engineers (IEEE) 802.15.4, ZigBee, Blue-Tooth, IEEE802.11 (Wi-Fi), Wireless Universal Serial Bus (USB), Wibree, radio frequency (RF) or the like, and the protocol with the lowest power consumption is preferable. Further, to ensure aviation safety, the wireless communication unit (20) can be manually turned off. Therefore, the user can switch the information exchange apparatus to exchange information or not on his/her own.

The storage unit (30) may comprise an irremovable memory (31) and a removable memory (32). The irremovable memory (31) and the removable memory (32) are connected to the processing unit (10). The removable memory (32) may be a non-volatile memory module, a memory card, a removable hard drive or the like. The storage unit (30) stores a device identification (ID) code, configuration data of the information exchange apparatus, data exchange records, user information and filter conditions. The device ID code is a unique code for a corresponding information exchange apparatus. Each data exchange record has exchanged content, exchange time and a device ID code of a peering information exchange apparatus. The filter conditions are used to filter the exchanged content by the processing unit (10). The device ID code of the corresponding information exchange apparatus must be stored in the irremovable memory (31), and the others may be stored either in the irremovable memory (31) or the removable memory (32).

The mainframe connection port (11) is connected to the processing unit (10) for connecting to a computer to upload and download data to and from the computer and allow the computer to set the configuration data of the information exchange apparatus. The mainframe connection port (11) may conform to a protocol such as USB, IEEE1394, Blue-Tooth or the like. Further, the information exchange apparatus may connect to other electronic devices such as Personal Digital Assistants (PDAs), Kiosks or the like by installing suitable firmware.

The identification module (40) is connected to the processing unit (10), has a secure memory (41) and stores an identification procedure. The secure memory (41) stores the device ID code and an identification key for the identification procedure. The device ID code and the identification key are encrypted when storing in the secure memory (41). The identification module (40) allows the processing unit (10) to access data in the storage unit (30) and exchange data in the storage unit (30) with other information exchange apparatus when the processing unit (10) executes and passes the identification procedure. Otherwise, the processing unit (10) cannot interpret the device ID code, the configuration data of the information exchange apparatus, the data exchange records, the user information and the filter conditions in the storage unit (30). Preferably, the identification procedure is implemented by a challenge-response authentication. The challenge-response authentication comprises multiple questions ("challenges") and answers ("responses"), and the processing unit (10) and the identification module (40) mutually present the questions and respond valid answers to corresponding questions. When both the processing unit (10) and the identification module (40) pass authentication with each other, the processing unit (10) is permitted to access the storage unit (30).

The identification module (40) and the processing unit (10) may be detachably or undetachably connected together. In the first embodiment of the present invention, the identification module (40) and the processing unit (10) are undetachably connected together.

Figure 2:
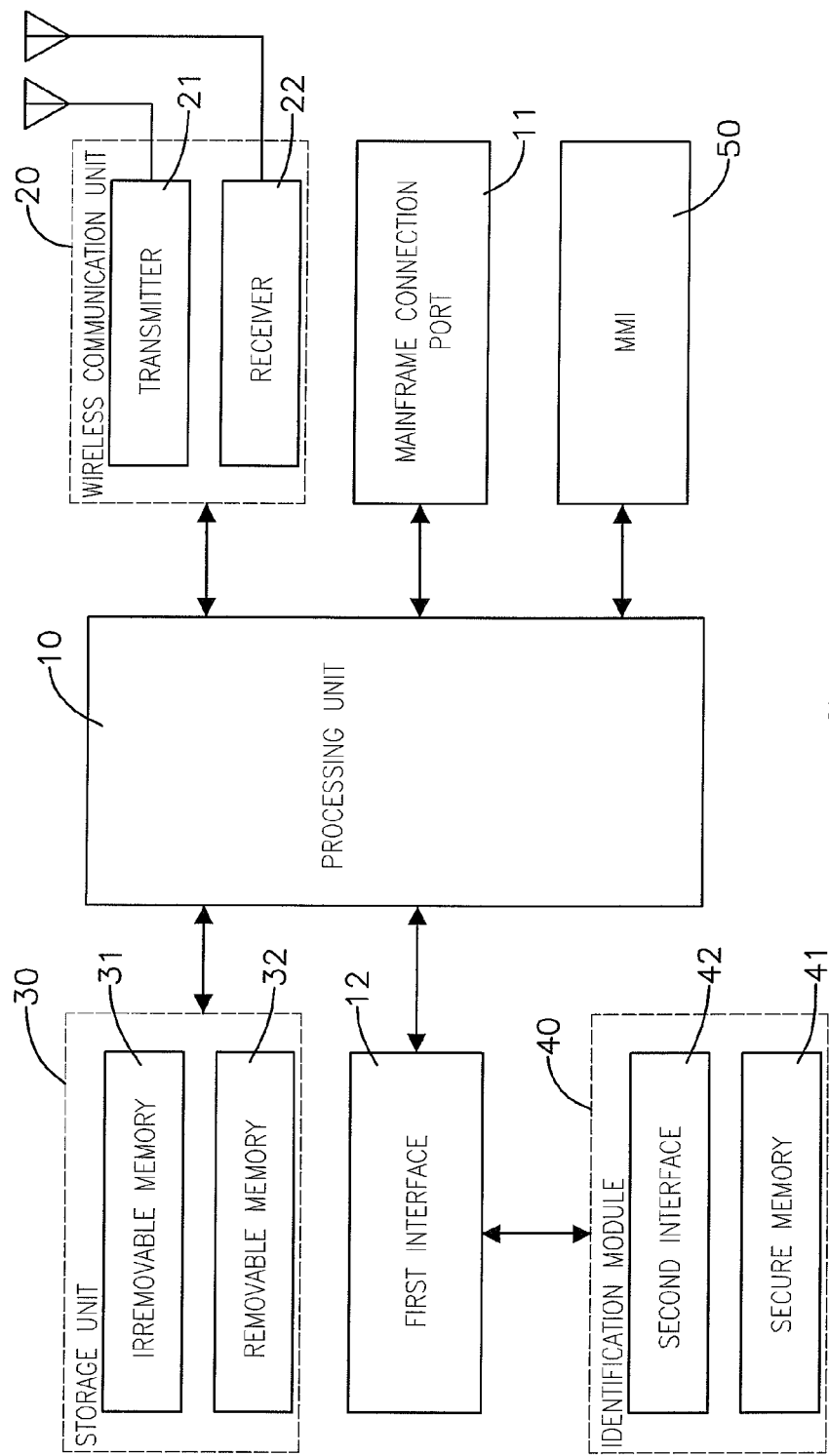
FIG. 2 is a functional block diagram of a second embodiment of an information exchange apparatus in accordance with the present invention.

FIG. 2 shows a second embodiment of the present invention. In the second embodiment of the present invention, the identification module (40) and the processing unit (10) may be detachably connected together. The information exchange apparatus of the present invention further comprises a first interface (12), which connects to the processing unit (10). The identification module (40) is a separate element in the second embodiment of the present invention and further comprises a second interface (42). The processing unit (10) connects to the identification module (40) through the first and the second interfaces (12, 42) to read data in the secure memory (41) and executes the identification procedure. The first and the second interfaces (12, 42) may be implemented to conform to a protocol such as Universal Asynchronous Receiver/Transmitter (UART), I²C, Serial Peripheral Interface Bus (SPI) or the like. In the second embodiment of the present invention, the identification module (40) preferably is a SmartCard.

The MMI (50) is connected to the processing unit (10), shows data to the user, notifies the user and allows the user to operate the information exchange apparatus. The MMI (50) comprises a flat panel display, an indication light, a vibrator, a speaker and multiple buttons. The flat panel display shows exchanged content and configuration data. The indication light may be implemented by light emitting diode (LED) or light bulb. The indication light, the vibrator and the speaker provide event notifications, such as a peering information exchange apparatus being approached or event warnings, immediately. The buttons allows the user to operate the information exchange apparatus.

Figure 3:
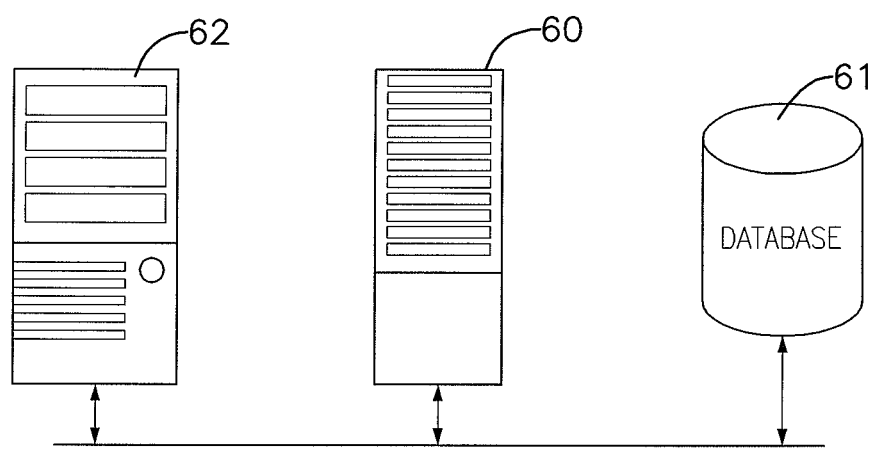
FIG. 3 is a functional block diagram of a managing system in accordance with the present invention.

With reference to FIG. 3, a managing system in accordance with the present invention allows at least one above-mentioned information exchange apparatus to connect thereto to upload or download data. The managing system comprises a website (60), a database (61) and a data analysis module (62).

The website (60) provides functions including receiving exchanged content and the data exchange records from the connected information exchange apparatus, providing new information from other information exchange apparatus to the connected information exchange apparatus and changing configuration data in the connected information exchange apparatus.

The database (61) is connected to the website (60) and stores basic information of the connected information exchange apparatus, the data exchange records in the connected information exchange apparatus, owner information, relationship data having relationships between the owner information and the basic information of the connected information exchange apparatus. The basic information of the connected information exchange apparatus may comprise the device ID code, firmware version, software version, service records and the like. The owner information of the information exchange apparatus may be a person or a shop, so the owner information may comprise name, gender, age, address or the like.

The data analysis module (62) is connected to the website (60) and the database (61) to analyze the information in the database (61) and the data exchange records from the connected information exchange apparatus and obtain analysis results. The analysis results may comprise a frequency, date, time and duration of exchanging data with a peering information exchange apparatus for the information exchange apparatus, connections between the information exchange apparatuses, the most probable location and time for meeting a peering information exchange apparatus, matching level between users of different information exchange apparatuses and the like.

The information exchange apparatus and managing system of the present invention used to make new friends is described in the following. A member card represents the information exchange apparatus of the present invention hereinafter, because the information exchange apparatus may be implemented to have a card appearance in the foregoing descriptions.

The member card is used to identify a user and stores records of the user and other target members with their member cards. In addition to analyzing the information in the database (61) and the data exchange records from the member card to obtain analysis results, the managing system also provides member registration, web log (blog) and other interactive capabilities as provided by a general community website. The user information stored in the storage unit (30) of the member card comprises member data and meeting records. The member data comprises member account, member serial number, blog Uniform Resource Locator (URL) and the like. Each meeting record comprises date, time and met member account.

The member card operates in either a standalone mode or a connection mode. The standalone mode is the default mode.

Figure 4:
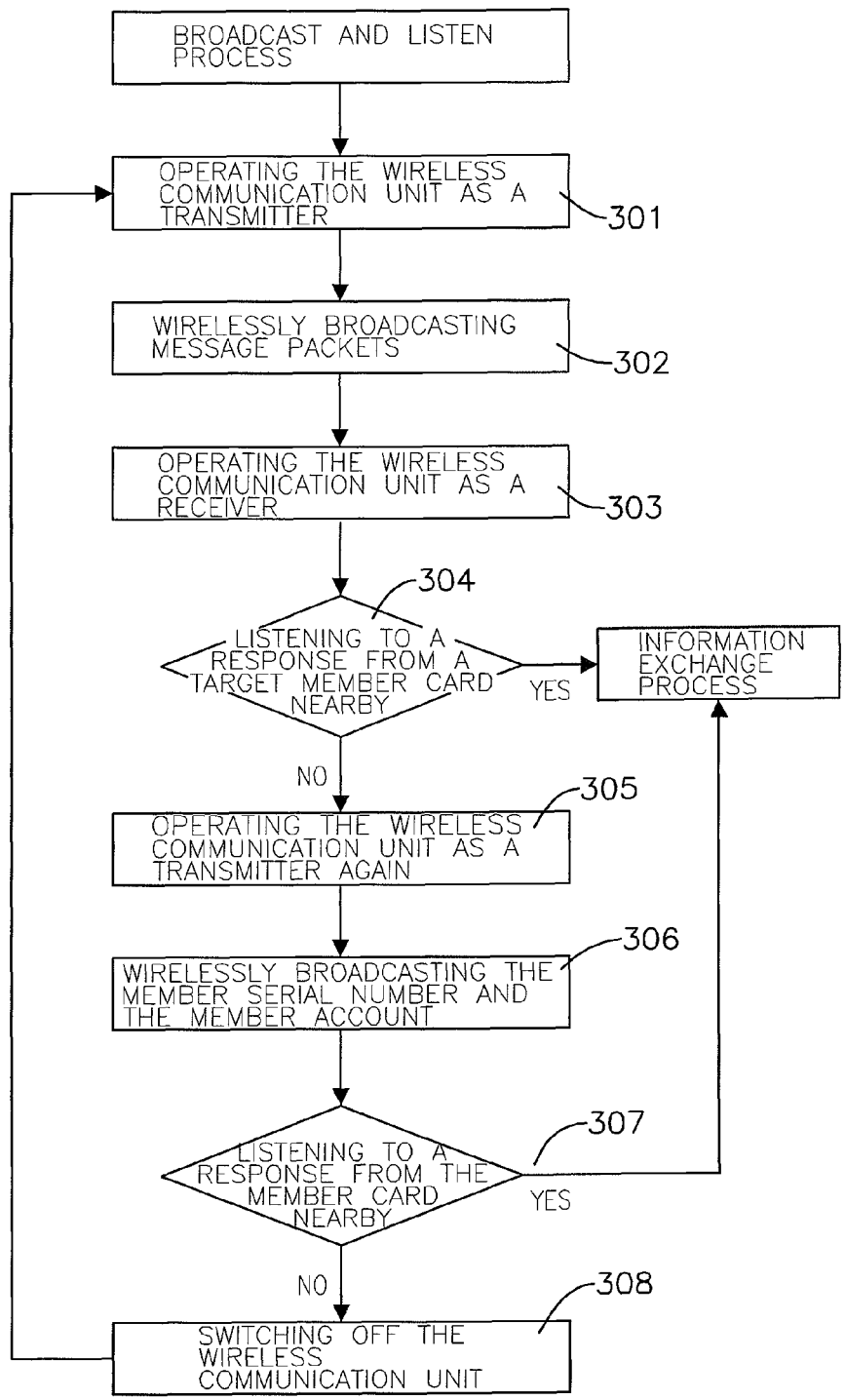
FIG. 4 is a flowchart of a broadcast and listen process applied to the information exchange apparatus operating in a standalone mode.

The standalone mode is operated when the member card does not connect to an electronic device such as a computer. In the standalone mode, the member card executes a broadcast and listen process. The broadcast and listen process allows the member card to find a target member card nearby. With further reference to FIG. 4, the broadcast and listen process comprises steps of operating the wireless communication unit as a transmitter (301), wirelessly broadcasting message packets (302), operating the wireless communication unit as a receiver (303) after broadcasting the message packets, listening to a response from a target member card nearby (304), operating the wireless communication unit as a transmitter again (305), wirelessly broadcasting the member serial number and the member account (306), listening to a response from the member card nearby (307) and switching off the wireless communication unit (308). The steps (301) to (308) are repeated.

In the step of wirelessly broadcasting message packets (302), each message packet may include initial messages, member serial number, member account and a message serial number.

In the step of listening to a response from a target member card nearby (304), a first duration for listening to the response from a member card nearby may be randomly between 0.1 to 0.5 seconds. If a response is received, an information exchange process is executed. The information exchange process is described later.

In the step of listening to a response from the member card nearby (307), a second duration for listening to the response from the member card nearby may be a result of subtracting the first duration from 0.6 seconds. If a response is received, an information exchange process is executed. Broadcasting and listening twice in 0.6 seconds increases the probability to establish a connection to a neighboring member card.

In the step of switching off the wireless communication unit (308), the processing unit (10) operates in a power consumption mode for 0.4 seconds.

The processing unit (10) monitors the mainframe connection port (11) while executing the above-mentioned broadcast and listen process. If the mainframe connection port (11) is connected to the electronic device such as a computer, the member card is changed to operate in the connection mode.

Figure 5:
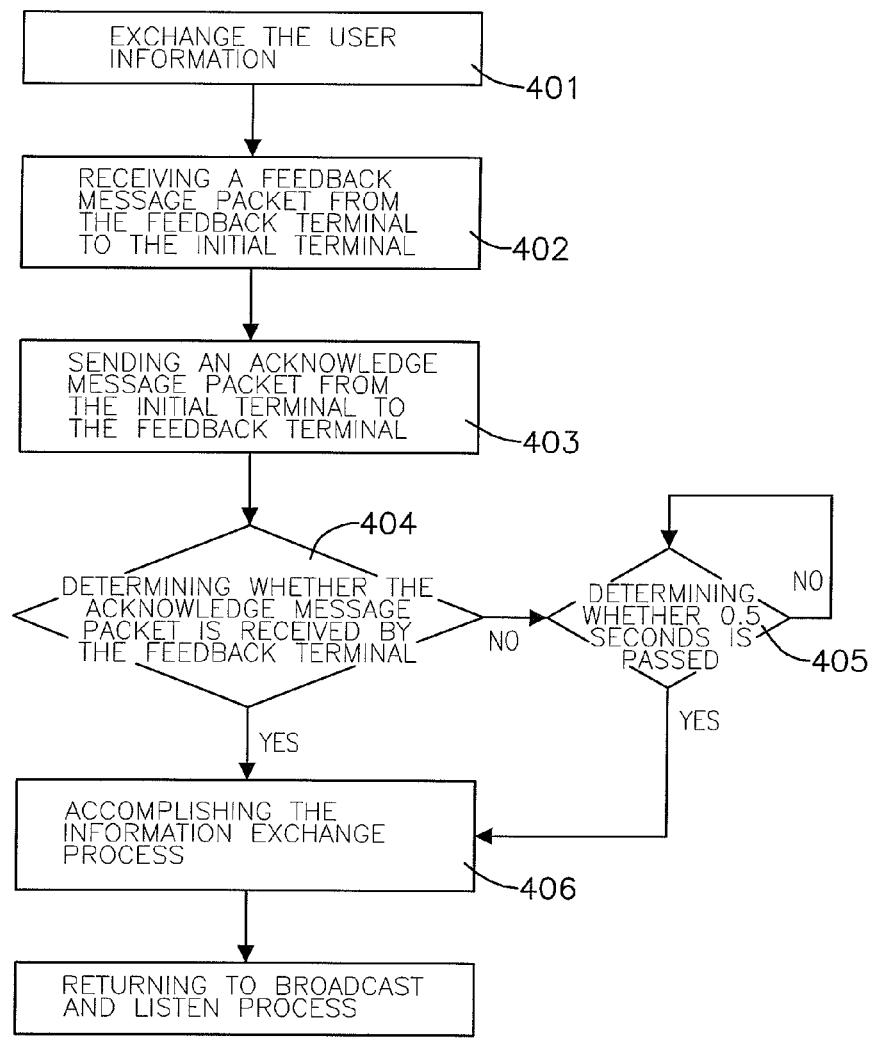
FIG. 5 is a flowchart of an information exchange process applied to the information exchange apparatus operating in the standalone mode.

With further reference to FIG. 5, the foregoing information exchange process comprises steps of exchange the user information (401) (an initial terminal and a feedback terminal respectively represent the information exchange apparatus broadcasting message packets and the peering information exchange apparatus hereinafter), receiving a feedback message packet from the feedback terminal to the initial terminal (402), sending an acknowledge message packet from the initial terminal to the feedback terminal (403), determining whether the acknowledge message packet is received by the feedback terminal (404) and accomplishing the information exchange process (406).

In the step of exchanging the user information (401), the information exchange process starts up when the member card receives message packets from another member card.

In the step of receiving a feedback message packet from the feedback terminal to the initial terminal (402), the feedback message packet may include feedback messages, a member serial number of the feedback terminal, a member account of the feedback terminal, a feedback message serial number, a member serial number of the initial terminal and the message serial number of the message packet.

In the step of sending an acknowledge message packet from the initial terminal to the feedback terminal (403), the acknowledge message packet may include acknowledge messages, the member serial number of the feedback terminal, the member account of the feedback terminal, an acknowledge message serial number, the member serial number of the initial terminal and the message serial number of the message packet. When the initial terminal confirms receiving the acknowledge messages, the initial terminal accomplishes the information exchange process, stores a new data exchange record and returns to the broadcast and listen process.

If the step of accomplishing the information exchange process (406), the feedback terminal accomplishes the information exchange process when the feedback terminal receives the acknowledge message packet from the initial terminal. Otherwise, a step of determining whether 0.5 seconds has passed (405) is executed. If 0.5 seconds has passed after the step of determining whether the acknowledge message packet is received by the feedback terminal (404), the step of accomplishing the information exchange process (406) is subsequently executed. The feedback terminal accomplishes the information exchange process, stores a new data exchange record and returns to the broadcast and listen process.

The connection mode is operated when the member card connects to the electronic device such as a computer. In this mode, the processing unit (10) simulates the member card to be a USB mass storage device so application programs on the computer can access the member card by issuing a USB ATAPI command. When the member card first connects to the managing system through the computer, the member card executes an activation process to write the member account and the user information to the member card and set the configuration data.

When the member card connects to the managing system again, the member card executes steps of uploading the data exchange records to the managing system through the computer and keeping a record of the uploaded data exchange records, and downloading the data exchange records to the storage unit in the member card and keeping a record of the downloaded data exchange records.

When applying the website in the managing system to be a general community website, the website in the managing system comprises a user interface, the database and a back-end processing program.

The database should comprise a member information table, a membership table and a member relationship table. The member information table comprises member serial number, manufacturing date, activation date, hardware version, firmware version and the like of every member. The membership table comprises the member serial number and a corresponding member account of every member. The member relationship table comprises time of each meeting, member serial number, member account, target member account, target member serial number and the like of every member.

If a website function requires interactions, such as uploading or downloading, with the member card, a specially-encoded URL can be returned from the website. When a web browser of the computer opens the URL, the driver installed in the computer intercepts the request and instructs the member card to react.

Further, when logging in the website, the website will require the computer to connect to the member card to enforce exchange data with the member card.

Therefore, the website in the managing system is ensured to have the latest data exchange records.

Besides, the present invention can also apply to E-commerce such as one-to-one commercial delivery and sale. At least one information exchange apparatus may be set in a shop, a public place or the like, and a fixed communication spot represents the information exchange apparatus set in a shop, a public place or the like. The fixed communication spot may broadcast wireless signals with a frequency. If required, the member card can be designed to broadcast periodic wireless signals voluntarily.

The member card and the fixed communication spot exchange data with each other when one of them detects the other one. The exchanged data may comprise device ID codes of the member card, the fixed communication spot or the like.

The fixed communication spot is capable of immediately or periodically uploading the user information of the connected member card and receiving the latest sale information and commercials.

When the member card is connected to the computer, the member card will upload the data exchange records to the website of the managing system through the computer and download interested sale information and commercials. The sale information and commercials can also be provided by the fixed communication spot. Therefore, the MMI (50) on the member card notifies the latest sale information and commercials to the user. The website in the managing system analyzes the data exchange records from the member card to obtain useful results.

If a place has multiple fixed communication spots, a multiple point positioning technique may be applied to the managing system to calculate and track the positions of the members carrying member cards.

Further, the fixed communication spot may provide a coupon code for the member card to download. When the user shows the member card showing the downloaded coupon, the member card represents an e-coupon. The coupon code may be issued to a specific member card based on requirement.

The member card may be used as a tool that automatically finds required or interested products or information by inputting interested and required information to the member card. If the member card finds that the fixed communication spot nearby provides matching products or information, the member card will receive the information from the fixed communication spot and notify the user. Alternatively, the managing system can automatically find out matching information, which can be downloaded to the member card when the user logs in to the member website.

In addition, the information exchange apparatus may be incorporated with an existing mobile electronic device such as a cellphone, a Global Positioning System (GPS) device, a notebook computer or the like with capabilities of positioning and wireless network so the information exchange apparatus further has a positioning capability and a wireless network capability. The positioning capability allows the information exchange apparatus to obtain location coordinates thereof and may be implemented by GPS, assisted GPS (A-GPS), Global System for Mobile Communications-based (GSM-based) location-based service (LBS), Wifi-based LBS or the like. The wireless network capability allows the information exchange apparatus to connect to the Internet and may be implemented by 2G/3G mobile data networks such as General Packet Radio Service (GPRS), Enhanced Data rates for GSM Evolution (EDGE), CDMA1x or wireless LANs such as IEEE 802.11a/b/g, or other wireless network technologies. The information exchange apparatus obtains the location coordinates by the positioning capability at set intervals, sends the location coordinates and data in the storage unit (30) to the Internet and receives exchanged information from other information exchange apparatus by using the wireless network capability at set intervals. The intervals mentioned above could be some fixed time of day, some fixed time duration since last position update, some fixed time duration since last data exchange with another information exchange apparatus, or the time when some other pre-programmed condition is met. Additionally, the managing system further receives the location coordinates from the information exchange apparatus through the Internet and calculates a distance between the two information exchange apparatuses from the location coordinates and data in the storage unit (30) of each information exchange apparatus. The managing system considers that the two information exchange apparatuses meet when the two information exchange apparatuses are close enough to each other and exchanges the data in the storage unit (30) of the information exchange apparatuses if they meet.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An information exchange apparatus for online dating comprising:
   a processing unit;
   a wireless communication unit having
      a transmitter connected to the processing unit to transmit data to a peering information exchange apparatus; and
      a receiver connected to the processing unit to receive data from the peering information exchange apparatus;
   a storage unit connected to the processing unit and storing
      a device identification (ID) code;
      user information; and
      data exchange records, with each data exchange record comprising exchanged content, time and a device ID code of the peering information exchange apparatus; and
   a mainframe connection port connected to the processing unit to connect the processing unit to an external electronic device, wherein the processing unit uploads and downloads data to and from the external electronic device and the external electronic device sets configuration data of the processing unit;
   wherein the processing unit directly exchanges the device ID code and the user information of the storage unit with that of the peering information exchange apparatus to identify the peering information exchange apparatus after finding out the peering information exchange apparatus to engage a date.

2. The information exchange apparatus as claimed in claim 1, wherein the information exchange apparatus performs an e-commerce transaction through the Internet.

3. The apparatus as claimed in claim 2 further comprising a first interface connected to the processing unit; and
   an identification module connected to the processing unit, storing an identification procedure and having a secure memory storing the device ID code and an identification key for the identification procedure, with the identification module allowing the processing unit to access data in the storage unit and exchange data in the storage unit with other information exchange apparatus when the processing unit executes and passes the identification procedure, and with the identification module further having a second interface connecting between the secure memory and the first interface to connect the processing unit and the secure memory.

4. The apparatus as claimed in claim 3, wherein
   the identification procedure is implemented by a challenge-response authentication comprising multiple challenges and responses,
   the processing unit and the identification module mutually present the challenges and respond valid responses to corresponding challenges, and
   the processing unit is permitted to access the secure memory when both the processing unit and the identification module pass authentication with each other.

5. The apparatus as claimed in claim 4, wherein the identification module is a SmartCard.

6. The apparatus as claimed in claim 5 further comprising a main-machine interface (MMI), wherein the MMI is connected to the processing unit and comprises
   a flat panel display showing the exchanged content and the configuration data; and
   multiple buttons allowing a user to operate the MMI.

7. The apparatus as claimed in claim 6, wherein the MMI further comprises an indication light, wherein the indication light provides event notifications.

8. The apparatus as claimed in claim 7, wherein the MMI further comprises a speaker, wherein the speaker provides event notifications.

9. The apparatus as claimed in claim 8, wherein the MMI further comprises a vibrator, wherein the vibrator provides event notifications.

10. The apparatus as claimed in claim 4 further comprising a man-machine interface (MMI), wherein the MMI is connected to the processing unit and comprises
    a flat panel display showing the exchanged content and the configuration data; and
    multiple buttons allowing a user to operate the MMI.

11. The apparatus as claimed in claim 10, wherein the MMI further comprises an indication light, wherein the indication light provides event notifications.

12. The apparatus as claimed in claim 11, wherein the MMI further comprises a speaker, wherein the speaker provides event notifications.

13. The apparatus as claimed in claim 12, wherein the MMI further comprises a vibrator, wherein the vibrator provides event notifications.

14. The apparatus as claimed in claim 3, wherein the first and the second interfaces are implemented to conform to a protocol selected from Universal Asynchronous Receiver/Transmitter (UART), I²C and Serial Peripheral Interface Bus (SPI).

15. The apparatus as claimed in claim 14 further comprising a man-machine interface (MMI), wherein the MMI is connected to the processing unit and comprises
    a flat panel display showing the exchanged content and the configuration data; and
    multiple buttons allowing a user to operate the MMI.

16. The apparatus as claimed in claim 15, wherein the MMI further comprises an indication light, wherein the indication light provides event notifications.

17. The apparatus as claimed in claim 16, wherein the MMI further comprises a speaker, wherein the speaker provides event notifications.

18. The apparatus as claimed in claim 17, wherein the MMI further comprises a vibrator, wherein the vibrator provides event notifications.

19. The apparatus as claimed in claim 3 further comprising a man-machine interface (MMI), wherein the MMI is connected to the processing unit and comprises
    a flat panel display showing the exchanged content and the configuration data; and
    multiple buttons allowing a user to operate the MMI.

20. The apparatus as claimed in claim 19, wherein the MMI further comprises an indication light, wherein the indication light provides event notifications.

21. The apparatus as claimed in. claim 20, wherein the MMI further comprises a speaker, wherein the speaker provides event notifications.

22. The apparatus as claimed in claim 21, wherein the MMI further comprises a vibrator, wherein the vibrator provides event notifications.

23. The apparatus as claimed in claim 1, wherein the storage unit comprises
    an irremovable memory storing the device ID code; and
    a removable memory.

24. The apparatus as claimed in claim 23 further comprising a main-machine interface (MMI), MMI is connected to the processing unit and comprises a flat panel display showing the exchanged content and the configuration data; and multiple buttons allowing a user to operate the MMI.

25. The apparatus as claimed in claim 24, wherein the MMI further comprises an indication light, wherein the indication light provides event notifications.

26. The apparatus as claimed in claim 25, wherein the MMI further comprises a speaker, wherein the speaker provides event notifications.

27. The apparatus as claimed in claim 26, wherein the MMI further comprises a vibrator, wherein the vibrator provides event notifications.

28. The apparatus as claimed in claim 1, wherein the wireless communication unit is implemented with a protocol selected from Institute of Electrical and Electronic Engineers (IEEE) 802.15.4, ZigBee, BlueTooth, IEEE802.11 (Wi-Fi), Wireless Universal Serial Bus (USB), Wibree and radio frequency (RF).

29. The apparatus as claimed in claim 28 further comprising a man-machine interface (MMI), wherein the MMI is connected to the processing unit and comprises a flat panel display showing the exchanged content and the configuration data; and multiple buttons allowing a user to operate the MMI.

30. The apparatus as claimed in claim 29, wherein the MMI further comprises an indication light, wherein the indication light provides event notifications.

31. The apparatus as claimed in claim 30, wherein the MMI further comprises a speaker, wherein the speaker provides event notifications.

32. The apparatus as claimed in claim 31, wherein the MMI further comprises a vibrator, wherein the vibrator provides event notifications.

33. The apparatus as claimed in claim 1 further comprising a man-machine interface (MMI), wherein the MMI is connected to the processing unit and comprises a flat panel display showing the exchanged content and the configuration data; and multiple buttons allowing a user t operate the MMI.

34. The apparatus as claimed in claim 33, wherein the MMI further comprises an indication light, wherein the indication light provides event notifications.

35. The apparatus as claimed in claim 34, wherein the MMI further comprises a speaker, wherein the speaker provides event notifications.

36. The apparatus as claimed in claim 35, wherein the MMI further comprises a vibrator, wherein the vibrator provides event notifications.

37. The apparatus as claimed in claim 1 further having a real-time positioning capability allowing the processing unit to obtain location coordinates of the processing unit and of the peering information exchange apparatus; and a wireless network capability allowing the processing unit to connect to the Internet.

38. The apparatus as claimed in claim 37, wherein the processing unit periodically obtains the location coordinates by the positioning capability, periodically sends the location coordinates and data in the storage unit to the Internet and receives exchanged information from other information exchange apparatus by using the wireless network capability.

39. An information exchange method applied to an information exchange apparatus operating in either a standalone mode or a connection mode, wherein the information exchange apparatus comprising:

a processing unit;

a wireless communication unit having a transmitter connected to the processing unit to transmit data to a peering information exchange apparatus; and a receiver connected to the processing unit to receive data from the peering information exchange apparatus;

a storage unit connected to the processing unit and storing a device identification (ID) code; user information; and data exchange records, with each data exchange record comprising exchanged content, time and a device ID code of a target the peering information exchange apparatus; and a mainframe connection port connected to the processing unit to connect the processing unit to an external electronic device, wherein the processing unit uploads and downloads data to and from the external electronic device and the external electronic device sets configuration data of the processing unit;

wherein the processing unit directly exchanges the device ID code and the user information of the storage unit with that of the peering information exchange apparatus to identify the peering information exchange apparatus after finding out the peering information exchange apparatus to engage a date;

the standalone mode is operated when the processing unit of the information exchange apparatus does not connect to the external electronic device with the processing unit executing a broadcast and listen process to find the peering information exchange apparatus nearby and exchanges data with the peering information exchange apparatus; and the connection mode is operated when the processing unit connects to the external electronic device to allow the external electronic device to access the processing unit.

40. The method as claimed in claim 39, wherein the broadcast and listen process comprises:

operating the wireless communication unit as a transmitter;
wirelessly broadcasting message packets;
operating the wireless communication unit as a receiver;
listening to a response from the peering information exchange apparatus nearby;
executing an information exchange process when receiving a response; and
repeating the foregoing.

41. The method as claimed in claim 40, wherein after listening to the response from the peering information exchange apparatus nearby, the method further comprises:

operating the wireless communication unit as a transmitter again;
wirelessly broadcasting the message packets;
listening to a response from the peering information exchange apparatus nearby; and
executing the information exchange process when receiving a response.

42. The method as claimed in claim 41 further comprising switching off the wireless communication unit for a while before returning to operating the wireless communication unit as the transmitter.

43. The method as claimed in claim 42, wherein in listening to the response from the peering information exchange apparatus nearby, a first duration for listening to the response from an information exchange apparatus nearby is randomly from 0.1 to 0.5 seconds.

44. The method as claimed in claim 43, wherein the processing unit continues to determine whether the processing unit is connected to the external electronic device and changes from the standalone mode to the connection mode when the processing unit connects to the external electronic device.

45. The method as claimed in claim 42, wherein the information exchange process comprises:
   exchanging the user information between the information exchange apparatus and the peering information exchange apparatus, wherein the information exchange apparatus broadcasting message packets is an initial terminal and the peering information exchange apparatus is a feedback terminal;
   receiving a feedback message packet output from the feedback terminal to the initial terminal;
   sending an acknowledge message packet from the initial terminal to the feedback terminal, wherein when the initial terminal confirms receiving the feedback messages, the initial terminal accomplishes the information exchange process, stores a new data exchange record and returns to the broadcast and listen process;
   determining whether receiving the acknowledge message packet by the feedback terminal; and
   accomplishing the information exchange process when either the feedback terminal receives the acknowledge message packet from the initial terminal or a duration is passed after determining whether receiving the acknowledge message packet by the feedback terminal.

46. The method as claimed in claim 41, wherein in listening to the response from the peering information exchange apparatus nearby, a first duration for listening to the response from an information exchange apparatus nearby is randomly from 0.1 to 0.5 seconds.

47. The method as claimed in claim 46, wherein the processing unit continues to determine whether the processing unit is connected to the external electronic device and changes from the standalone mode to the connection mode when the processing unit connects to the external electronic device.

48. The method as claimed in claim 41, wherein the information exchange process comprises:
   exchanging the user information between the information exchange apparatus and the peering information exchange apparatus, wherein the information exchange apparatus broadcasting message packets is an initial terminal and the peering information exchange apparatus is a feedback terminal;
   receiving a feedback message packet output from the feedback terminal to the initial terminal;
   sending an acknowledge message packet from the initial terminal to the feedback terminal, wherein when the initial terminal confirms receiving the feedback messages, the initial terminal accomplishes the information exchange process, stores a new data exchange record and returns to the broadcast and listen process;
   determining whether receiving the acknowledge message packet by the feedback terminal; and
   accomplishing the information exchange process when either the feedback terminal receives the acknowledge message packet from the initial terminal or a duration is passed after determining whether receiving the acknowledge message packet by the feedback terminal.

49. The method as claimed in claim 40, wherein in listening to the response from peering information exchange apparatus nearby, a first duration for listening to the response from an information exchange apparatus nearby is randomly from 0.1 to 0.5 seconds.

50. The method as claimed in claim 49, wherein the processing unit continues to determine whether the processing unit is connected to the external electronic device and changes from the standalone mode to the connection mode when the processing unit connects to the external electronic device.

51. The method as claimed in claim 40, wherein the information exchange process comprises:
   exchanging the user information between the information exchange apparatus and the peering information exchange apparatus, wherein the information exchange apparatus broadcasting message packets is an initial terminal and the peering information exchange apparatus is a feedback terminal;
   receiving a feedback message packet output from the feedback terminal by the initial terminal;
   sending an acknowledge message packet from the initial terminal to the feedback terminal, wherein when the initial terminal confirms receiving the feedback messages, the initial terminal accomplishes the information exchange process, stores a new data exchange record and returns to the broadcast and listen process;
   determining whether receiving the acknowledge message packet by the feedback terminal; and
   accomplishing the information exchange process when either the feedback terminal receives the acknowledge message packet from the initial terminal or a duration is passed after determining whether receiving the acknowledge message packet by the feedback terminal.

52. The method as claimed in claim 39, wherein when the processing unit first connects to the external electronic device, the processing unit executes an activation process to write a member account and the user information to the processing unit and set the configuration data.

53. The method as claimed in claim 52, wherein when the processing unit connects to the external electronic device again, the processing unit executes:
   uploading the data exchange records to the external electronic device and keeping a record of the uploaded data exchange records; and
   downloading the data exchange records to the storage unit and keeping a record of the downloaded data exchange records.

54. A managing system allowing connections from at least one information exchange apparatus comprising:
   the at least one information exchange apparatus comprising:
      a processing unit;
      a wireless communication unit having a transmitter connected to the processing unit to transmit data to a peering information exchange apparatus; and
      a receiver connected to the processing unit to receive data from the peering information exchange apparatus;
      a storage unit connected to the processing unit and storing a device identification (ID) code; user information; and data exchange records, with each data exchange record comprising exchanged content, time and a device ID code of a target the peering information exchange apparatus; and
      a mainframe connection port connected to the processing unit to connect the processing unit to an external electronic device, wherein the processing unit uploads and downloads data to and from the external electronic device and the external electronic device sets configuration data of the processing unit;

wherein the processing unit directly exchanges the device ID code and the user information of the storage unit with that of the peering information exchange apparatus to identify the peering information exchange apparatus after finding out the peering information exchange apparatus to engage a date;

a database storing basic information of the at least one information exchange apparatus, the data exchange records in the at least one information exchange apparatus, owner information and information of the relationship between the owners and the at least one information exchange apparatus;

a website connected to the database, receiving the basic information and the data exchange records uploaded from the at least one information exchange apparatus and allowing the at least one information exchange apparatus to download data from the website; and a data analysis module connected to the database and the website to analyze the information in the database and the data exchange records and obtain analysis results comprising a frequency, date and time of exchanging data with the peering information exchange apparatus.

55. The managing system as claimed in claim 54, wherein the website receives the exchanged content and the data exchange records from the at least one information exchange apparatus, providing new information from other information exchange apparatus to the at least one information exchange apparatus and changing configuration data in the at least one information exchange apparatus.

56. The managing system as claimed in claim 55, wherein the data analysis module obtains analysis results comprising duration of exchanging data with the peering information exchange apparatus, connections between the at least one information exchange apparatus, the most probable location and time for meeting the peering information exchange apparatus or matching level between users of different information exchange apparatuses.

57. The managing system as claimed in claim 56, wherein
the basic information of the at least one information exchange apparatus comprises the device ID code, firmware version, software version and service records; and
the owner information comprises name, gender, age and address of an owner of the at least one information exchange apparatus.

58. The managing system as claimed in claim 57 further
receiving location coordinates from the at least one information exchange apparatus through the Internet;
calculating a distance between two information exchange apparatuses from the location coordinates and data in the storage unit of each information exchange apparatus;
considering that the two information exchange apparatuses meet when the two information exchange apparatuses are close to each other; and
exchanging the data in the storage units of the two information exchange apparatuses if they meet.

\* \* \* \* \*